Dec. 1, 1936.  L. LOEWENSTEIN  2,062,754
DEVICE FOR MOLDING FROZEN CONFECTIONS
Filed July 31, 1934   3 Sheets-Sheet 1
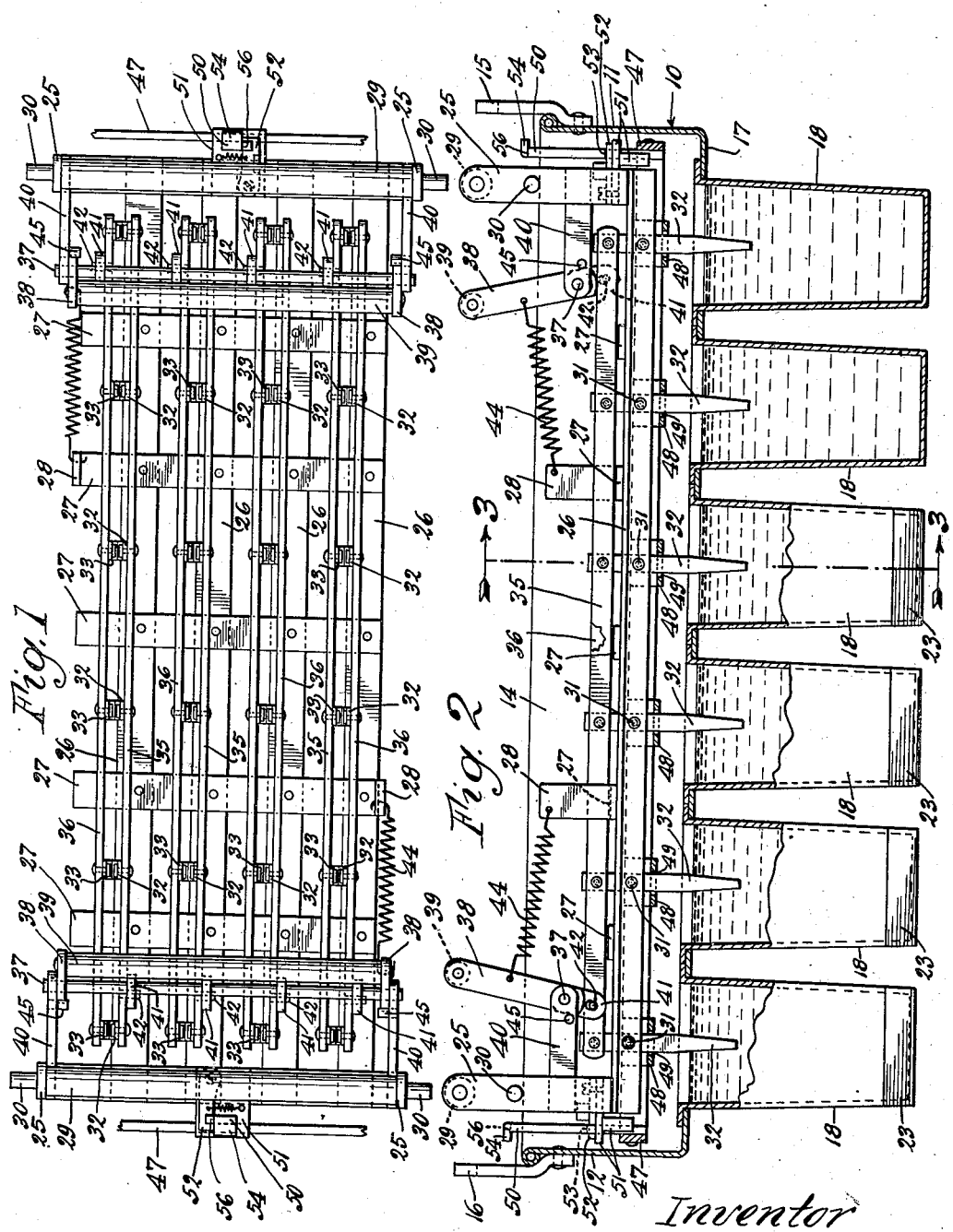
Inventor
Ludwig Loewenstein
by Henry Flesh
Attorney

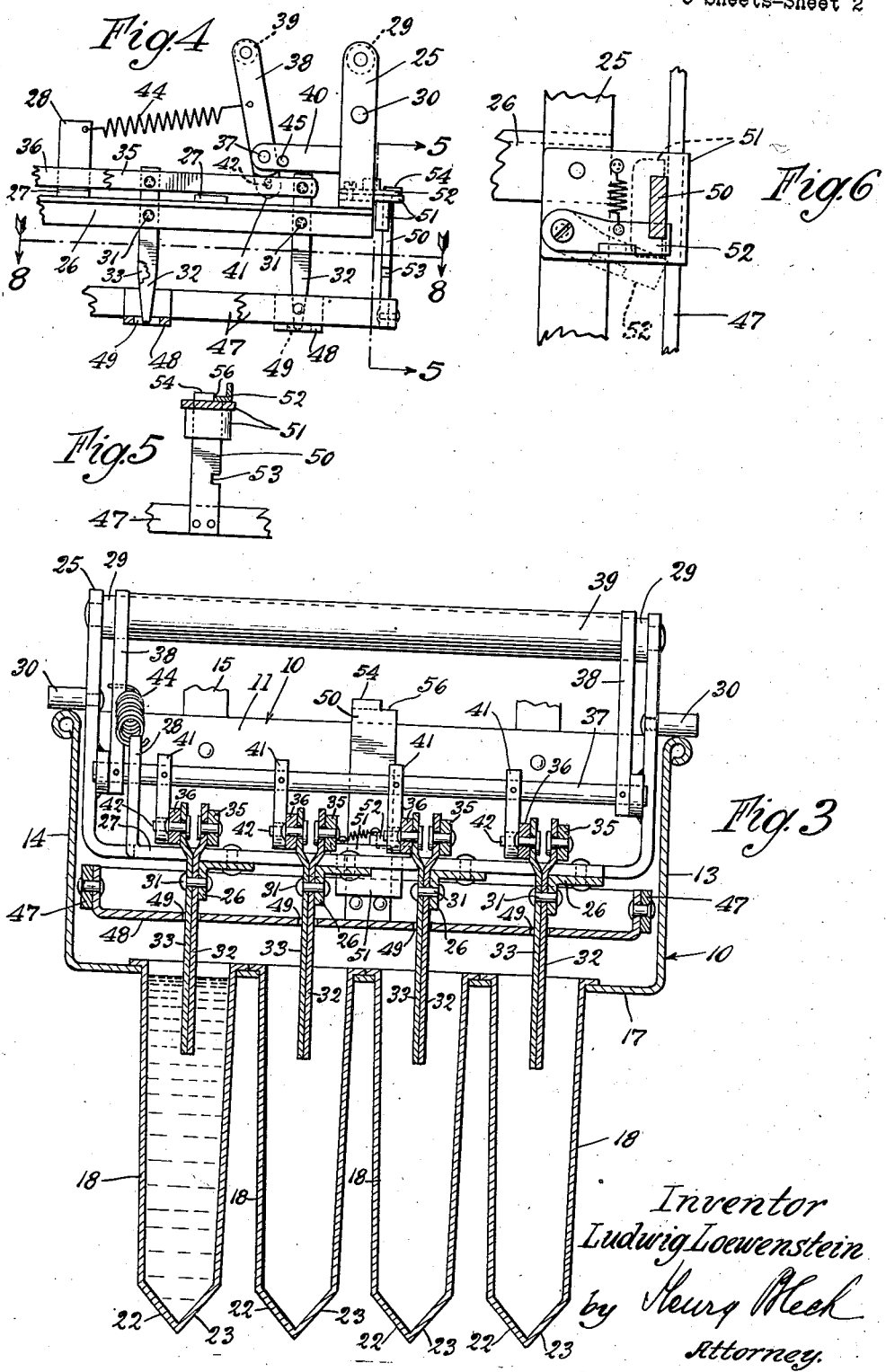
Dec. 1, 1936.  L. LOEWENSTEIN  2,062,754
DEVICE FOR MOLDING FROZEN CONFECTIONS
Filed July 31, 1934  3 Sheets-Sheet 2
Inventor
Ludwig Loewenstein
by Henry Bleck
Attorney Dec. 1, 1936.      L. LOEWENSTEIN      2,062,754
DEVICE FOR MOLDING FROZEN CONFECTIONS
Filed July 31, 1934      3 Sheets-Sheet 3
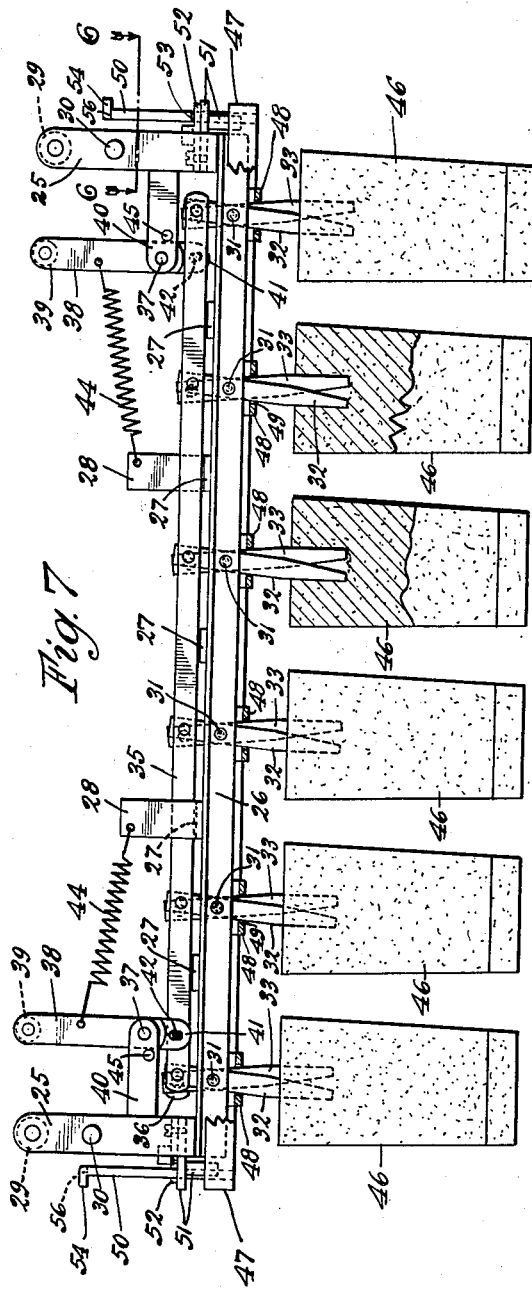
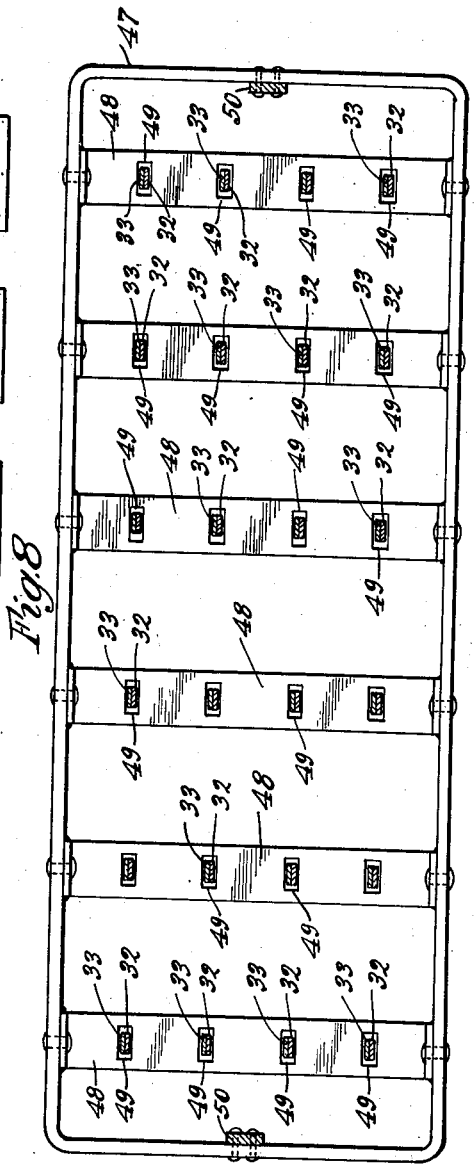
Inventor
Ludwig Loewenstein
by Henry Blech
Attorney.

Patented Dec. 1, 1936

2,062,754

UNITED STATES PATENT OFFICE 2,062,754

DEVICE FOR MOLDING FROZEN CONFECTIONS

Ludwig Loewenstein, Chicago, Ill.

Application July 31, 1934, Serial No. 737,815

6 Claims. (Cl. 107—8)

My invention relates to means for molding frozen confections, and its principal object comprises the provision of a mold for the production of a plurality of frozen confections supporting a carrier to which the confections congeal, so that all of the confections frozen to the carrier may be removed from the mold and the carrier as a unit.

It is an object of the invention to provide a carrier having means to which each frozen confection is individually attached by congelation, there being reciprocating means associated with said carrier for removing the confections from the carrier.

It is a further object of the invention to provide a carrier for frozen confections which enables the removal of the frozen confections from the mold and the deposit of the confections in the same relative position that the confections occupy in the mold.

It is still a further object of the invention to provide a mold having a carrier provided with supporting means to which a scissor-like action may be imparted by manual operable means for releasing the confections from the carrier.

It is still a further object to provide manual operable means for protecting and shielding the individual supporting means to which the confections congeal when desired.

It is also an object of the invention to provide certain details of construction and arrangement tending to enhance the reliability and utility of a device of the character described.

With these and other equally important objects in view which will become apparent from a perusal of the invention, the latter comprises the means described in the following specification, particularly pointed out in the claims forming a part thereof, and illustrated in the accompanying drawings, in which:

Fig. 1 is a plan view of my invention with parts broken away,

Fig. 2 is a front elevation with parts broken away and parts in section,

Fig. 3 is an enlarged section taken along the line 3—3 of Fig. 2,

Fig. 4 is a fragmentary front elevation illustrating the protecting means in operative position, Fig. 5 is a section taken along the line 5—5 of Fig. 4, Fig. 6 is an enlarged section along the line 6—6 of Fig. 7, Fig. 7 is a front elevation of the carrier removed from the mold with the parts in different positions, and Fig. 8 is a section along the line 8—8 of Fig. 4.

Like parts are designated by like characters throughout the specification and drawings.

Referring to the several views of the drawings, the mold, generally designated by 10, comprises a box-like structure of rectangular cross-section having end walls 11 and 12 and side walls 13 and 14, the end walls having secured thereto, by riveting or in any other suitable approved manner, handles 15 and 16 for the lowering and lifting of the mold.

The bottom 17 of the mold is formed with a number of longitudinal openings, there being six series of four openings parallel to the end walls of the mold box, so that a total of twenty-four openings are provided. However, the number of openings provided may be varied to suit the particular requirements and the number shown in the drawings is merely given by way of example.

In each opening are suspended containers 18, and are secured thereto in any suitable manner. The containers are tapered toward the bottom and are provided at the sides with beveled edges 22 and 23, (Fig. 3) so that the frozen confection may be easily withdrawn from the containers.

In the mold box 10 is inserted a cradle-like frame which comprises U-shaped members 25 connected by longitudinal angle members 26 which in turn are connected by cross bars 27. Two of said bars 27 are formed with upward extensions 28. The upwardly extending ends of the U-shaped members 25 are connected by a handle bar 29 and are further provided with pins or abutments 30 which rest upon the upper rolled edge of the side walls 13 and 14 of the mold to support the cradle structure a predetermined distance above the containers 18.

Pivotally mounted as at 31 to the angle member 26 are the levers or pins 32, and 33, as will be seen in Figs. 2, 3, and 7. The pins are in pairs, one pair for each container, and depend a sufficient distance to enter the containers 18 so that upon the congelation of the confection in each container, it freezes to the pins or levers 32, 33, and is thus rigid therewith.

As shown in the drawings, there is one pair of such pins for each container, however, a plurality of such pins may be employed for containers of large capacity.

The pins are preferably tapered at their ends but this may not be necessary. The length of the lever or pins may vary depending upon the frozen confection to be used. An ice cream generally requires larger pins than water ice.

It is preferable that the pins be of no greater cross section than required to withdraw the frozen confections from the mold.

In order to impart to the levers 32 and 33 a scissor-like action for releasing frozen confections therefrom, I may employ the mechanism shown particularly in Figs. 1, 2, 3, and 7.

Pivotally connected to the upper ends of the levers 32 are bars 35. The adjacent levers 33 are likewise connected with bars 36.

In order to actuate the bars 35 and 36 to impart longitudinal movement to said bars, I have shown the following mechanism:

Mounted on shafts 37 are the levers 38 connected by handles 39. The shafts 37 are supported in brackets 40 secured, for example, by bracing or riveting to the U-shaped members 25. By means of links 41, secured to the shafts 37, in engagement with pins 42 on the bars 35 and 36, the bars 35 and 36 may be moved longitudinal and thus impart a scissor-like motion to the pins 32 and 33.

It will be noted, particularly in Fig. 1, that all the pins 33 are actuated by the handle 39 on the right side of the cradle as viewed in Figs. 1 and 2, whereas the pins 32 are actuated by means of the handle 39 on the left side.

Springs 44 anchored to the extensions 28 and to the levers 38, serve to hold the parts in the positions as shown in Fig. 2.

Stop pins 45 on the brackets 40 in engagement with the lever 38, limit rotation of the shafts 37 and serve to align the members as shown in the drawings.

In use, the cradle frame is inserted into a filled mold 10 so that the depending pins 32 and 33 enter the containers 18.

After congelation, the containers of the mold are inserted in a bath of hot water which breaks the bond of the frozen confections and the containers. By means of the handles 29, together with the frozen confections 46 adhering to the pins 32, 33 the cradle frame may be lifted out of the mold and brought to the place where the confections are to be discharged.

If desired, the confection may be dipped in chocolate or other coating and permitted to harden.

By manually moving the handle bars 39 which actuate their associated mechanism previously described, the pins 32 and 33 receive a scissor-like motion which breaks the bond between the frozen confections 46 and said pins, and the confections drop by gravity into any suitable tray, containers or the like.

In order to protect the tapered ends of the pins 32 and 33 during handling, washing and storing of the carriers, I may employ protecting means, comprising a rectangular shaped bar 47 provided with cross members 48 which are slotted as at 49 through which the pins 32 and 33 project.

The rectangular member 47 is provided with uprights 50 at either end which are supported in bearing members 51 on the U-shaped members 25. By means of spring thrust latch members 52 engaging slots 53 in the uprights 50, the rectangular frame 47 is held in its uppermost position as shown in Fig. 2.

The cross members 48 are held a sufficient distance above the containers 18 and of the frozen confections, as illustrated in Fig. 7, to permit coating of the confections 46, if desired. When the frozen confections are released, the rectangular frame member 47 may be lowered in its lowermost position, shown in Fig. 4 by moving the latch members 52 in the dotted line position shown in Fig. 6. This permits the member 47 to drop until the offset portions 54 come in contact with the guide members 51.

The spring thrust latch members now engage the cutout portions 56 on the members 50 and thus prevent upward movement of the member 47.

In this position (Fig. 4) the tapered ends of the pins 32 and 33 terminate above the lower face of the cross members 48.

While the drawings show preferred embodiments of the invention, numerous changes, alterations, revisions and modifications may be made without departing from the scope of the invention.

I, therefore, do not wish to limit myself to the details of construction or arrangement of parts, as shown, but claim my invention as broadly as the state of art permits.

I claim:

1. A device for molding frozen confections, including a mold having a plurality of separate mold cavities, a portable carrier supported above said mold cavities, a plurality of pairs of pins mounted on said carrier, each of said pairs of pins extending from said carrier into each of the separate mold cavities to have the confections congeal thereon, and means for imparting relative movement to each of the pairs of pins to release the frozen confections for discharge, said pins remaining in said confections until discharge.

2. A device for molding frozen confections, including a mold having a plurality of separate mold cavities, a portable carrier supported above said mold cavities, a plurality of pairs of movable pins mounted on said carrier, each of said pairs of pins extending from said carrier into each of the separate mold cavities to have the confections congeal thereon, the pins of each pair being pivotally connected and means for moving said pins of each pair relatively to each other to thereby release the frozen confections for discharge.

3. A device for molding frozen confections, including a mold having a plurality of separate mold cavities, a portable carrier supported above said mold cavities, a plurality of pairs of pins pivotally secured to said carrier, and pivotally connected to each other, each of said pairs of pins extending from said carrier into each of the separate mold cavities to have the confections congeal thereon, and means for moving said pins of each pair relatively to each other to thereby break the bond with the confections.

4. A device for molding frozen confections, including a mold having a plurality of separate mold cavities, a portable carrier supported above said mold cavities, a plurality of pairs of movable pins mounted on said carrier, each of said pairs of pins extending from said carrier into each of the separate mold cavities to have the confections congeal thereon, means for moving corresponding pins of each pair in unison, and means for moving the other pins of each pair in unison to thereby release the frozen confections simultaneously for discharge.

5. A device for molding frozen confections, including a mold having a plurality of separate mold cavities, a portable carrier supported above said mold cavities, a plurality of pairs of pins mounted on said carrier, each of said pairs of pins extending from said carrier into each of the separate mold cavities to have the confections congeal thereon, and means for imparting to the pairs of pins a shearing action to break the bond with the confections.

6. A device for molding frozen confections, including a mold having a plurality of mold cavities, a portable carrier supported above said mold cavities, pins depending from said carrier into said mold cavities to have the confections congeal thereon and means for imparting movement to said pins about a horizontal axis relative to the confections to break the bond therewith.

LUDWIG LOEWENSTEIN.